(12) United States Patent
Chivite Zabalza et al.

(10) Patent No.: US 12,326,109 B2
(45) Date of Patent: Jun. 10, 2025

(54) ELECTRICAL POWER SYSTEM CONVERTER CONTROL

(71) Applicant: ROLLS-ROYCE plc, London (GB)

(72) Inventors: Francisco Javier Chivite Zabalza, Stafford (GB); David R Trainer, Derby (GB); Mark Sweet, Chesterfield (GB); Matthew C Morris, Glasgow (GB); Zafer Jarrah, Bristol (GB); James A Campbell, Nottingham (GB)

(73) Assignee: ROLLS-ROYCE plc, London (GB)

( * ) Notice: Subject to any disclaimer, the term of this patent is extended or adjusted under 35 U.S.C. 154(b) by 371 days.

(21) Appl. No.: 17/950,423

(22) Filed: Sep. 22, 2022

(65) Prior Publication Data

US 2023/0124932 A1    Apr. 20, 2023

(30) Foreign Application Priority Data

Oct. 20, 2021 (GB) .................................. 2115016

(51) Int. Cl.
*F02C 6/00*    (2006.01)
*B64D 27/10*   (2006.01)
(Continued)

(52) U.S. Cl.
CPC ................ *F02C 6/00* (2013.01); *B64D 27/10* (2013.01); *B64D 27/24* (2013.01); *H02J 3/02* (2013.01);
(Continued)

(58) Field of Classification Search
None
See application file for complete search history.

(56) References Cited

U.S. PATENT DOCUMENTS

2007/0047274 A1    3/2007  Hwang
2013/0208514 A1    8/2013  Trainer et al.
(Continued)

FOREIGN PATENT DOCUMENTS

DE    19548612 A1    6/1997
EP    0867998 A1     9/1998
(Continued)

OTHER PUBLICATIONS

Fayyaz "Performance and Robustness Characterisation of SiC Power MOSFETs" (Year: 2017).*
(Continued)

*Primary Examiner* — Gerald L Sung
*Assistant Examiner* — Jacek Lisowski
(74) *Attorney, Agent, or Firm* — Oliff PLC

(57) ABSTRACT

An electrical power system includes: an electrical machine to output AC; DC electrical network; power electronics converter connected between the AC output of the electrical machine and the DC electrical network and having a phase leg having first and second branches respectively having first and second bi-directional MOSFETs; and controller controlling switching of the first and second bi-directional MOSFETs of each phase leg of the converter so that current is commutated between the phase leg first and second branches rectifying the AC input to DC to supply the DC electrical network with DC electrical power. The controller is responsive to a determination to the effect that there is a fault in the DC electrical network, to control the switching of each phase leg first and second bi-directional MOSFETs to switch the converter into a crow-bar configuration in which electrical machine current does not flow to the DC network.

18 Claims, 9 Drawing Sheets

(51) Int. Cl.
    *B64D 27/24*    (2006.01)
    *H02J 3/02*     (2006.01)
    *H02M 1/00*    (2006.01)
    *H02M 1/12*    (2006.01)
    *H02M 5/458*   (2006.01)
    *H02M 7/219*   (2006.01)
    *B64D 27/02*   (2006.01)

(52) U.S. Cl.
    CPC ........... *H02M 1/0058* (2021.05); *H02M 1/12* (2013.01); *H02M 5/4585* (2013.01); *H02M 7/219* (2013.01); *B64D 27/026* (2024.01); *B64D 2221/00* (2013.01)

(56) References Cited

U.S. PATENT DOCUMENTS

| | | |
|---|---|---|
| 2015/0155794 A1 | 6/2015 | Long |
| 2017/0033708 A1 | 2/2017 | Elserougi et al. |
| 2018/0316275 A1 | 11/2018 | Yoshida |
| 2020/0119634 A1 | 4/2020 | Perkiö et al. |
| 2021/0175815 A1 | 6/2021 | Bruce |
| 2022/0190591 A1* | 6/2022 | Wang .................. H02H 7/1257 |

FOREIGN PATENT DOCUMENTS

| | | |
|---|---|---|
| EP | 2858231 A1 | 4/2015 |
| EP | 2999105 A1 | 3/2016 |
| EP | 3780367 A1 | 2/2021 |
| GB | 2519791 A | 5/2015 |
| WO | 2015/062970 A1 | 5/2015 |

OTHER PUBLICATIONS

Green Power Co. "Rectifier Output Smoothing" (Year: 2017).*
Wikipedia "Auxiliary power unit" (Year: 2020).*
Apr. 22, 2022 Combined Search and Examination Report issued in Great Britain Patent Application No. GB2115016.4.
U.S. Appl. No. 17/950,445, filed Sep. 22, 202 under inventor name Francisco Javier Chivite Zabalza et al.
Apr. 20, 2022 Search Report issued in Great Britain Patent Application No. GB2115015.6.
Apr. 22, 2022 Search Report issued in Great Britain Patent Application No. GB2115016.4.
Feb. 28, 2023 Search Report issued in European Patent Application No. 22196867.0.
Yu, Jin-Yeol, "A New Thyristor DC Solid-State Circuit Breaker Capable of Performing Operating Duty," 2019 22nd International Conference on Electrical Machines and Systems (ICEMS), Aug. 11, 2019, pp. 1-4.
Jul. 18, 2024 Office Action issued in European Patent Application No. 22196867.0.
Feb. 24, 2023 Search Report issued in European Patent Application No. 22196868.8.
Wikipedia "Clipper (electronics)" (Year: 2020).

* cited by examiner

ELECTRICAL POWER SYSTEM CONVERTER CONTROL

CROSS-REFERENCE TO RELATED APPLICATIONS

This specification is based upon and claims the benefit of priority from United Kingdom Patent Application No. 2115016.4, filed on 20 Oct. 2021, the entire contents of which are incorporated herein by reference.

TECHNICAL FIELD

This disclosure relates to electrical power systems, more particularly to the control of power electronics converters in electrical power systems. The electrical power systems may be of particular utility in transport applications including but not limited to aerospace.

BACKGROUND

In aerospace, aircraft and their power and propulsion systems are becoming increasingly electric in their design. So-called 'more electric engines' (MEEs) and 'more electric aircraft' (MEAs) derive all or substantially all of their propulsive thrust from turbomachinery but make greater use of electrical power compared with conventional platforms. They may, for example, use electrical power to power auxiliary systems which have previously been powered mechanically or pneumatically, or may use spool-coupled electrical machines to transfer power to, from and between engine spools to provide improvements in engine operability and efficiency. In hybrid electric aircraft the propulsive thrust is derived from engines (e.g., gas turbine engines) and from other sources, typically batteries and/or fuel cells which supply electrical power to engine- or propulsor-coupled electrical machines.

Some proposed more electric and hybrid electric platforms include DC electrical networks which receive electrical power from engine-driven electrical machines via AC to DC converters (i.e. rectifiers). The upper circuit of FIG. 4 illustrates a typical arrangement in which a three-phase electrical generator, which may be coupled with and driven by a spool of a gas turbine engine, is connected with a DC network via a two-level AC-DC converter. Each phase leg of the converter has two transistors (e.g., IGBTs), each of which is connected in anti-parallel with an associated diode. To rectify the AC output of the generator, for each phase leg current is commutated between the upper diode and the lower transistor, with each conducting for half of each AC cycle.

The lower circuit of FIG. 4 illustrates the effect of a fault in the DC network which places a low impedance across the network terminals. In this case both the DC and AC sides of the converter assume a low voltage condition, which in the limit may be zero Volts. In this condition there is no voltage to reverse bias the diodes, which means the AC-DC converter loses control and in effect reverts to being an uncontrolled diode rectifier. The level of current which will be supplied to the DC network in the faulted condition will therefore depend mainly on the voltage generated by and the impedance of the electrical machine.

In some applications it is acceptable for the converter to operate as an uncontrolled diode rectifier when there is a DC network fault. In other applications, however, including aerospace applications, this mode of operation may be highly undesirable because the electrical machines may generate high voltages and/or may have low impedances, such that the high levels of fault current will be supplied to the fault site in the DC network.

It would be desirable to be able to control the level of fault current supplied to the DC electrical network in the presence of a DC network fault.

SUMMARY

The invention is directed to an electrical power system, a method of controlling an electrical power system and a controller for an electrical power system as set out in the appended claims.

According to a first aspect, there is provided an electrical power system comprising: an electrical machine operable to output AC; a DC electrical network; a power electronics converter connected between the AC output of the electrical machine and the DC electrical network and comprising, for each phase of the AC output, a phase leg comprising a first branch having a first bi-directional MOSFET and a second branch having a second bi-directional MOSFET; and a controller configured to control switching of the first and second bi-directional MOSFETs of each phase leg of the converter so that, during normal operation of the electrical power system, current is commutated between the first and second branches of the phase leg to rectify the AC input to DC to supply the DC electrical network with DC electrical power. The controller is further configured, responsive to a determination to the effect that there is a fault in the DC electrical network, to control the switching of the first and second bi-directional MOSFETs of each phase leg to switch the converter into a crow-bar configuration in which current from the electrical machine does not flow to the DC network.

In the event of a fault in the DC electrical network the DC-side voltage collapses, removing the voltage which normally reverse-biases the converter diodes (which may be diodes separate from the transistors or body diodes of the transistors). Ordinarily this prevents commutation of the current between the branches of the phase legs, leaving the converter in the uncontrolled diode rectifier state. However, by using bi-directional MOSFETs (i.e., Metal-Oxide-Semiconductor Field-Effect Transistors) it remains possible to commutate the current between the first and second branches because current does not need to flow through any of the converter diodes due to the bi-directional capability of the MOSFETs. Further, by switching the converter into a crow-bar configuration, the time-averaged fault current conducted from the electrical machine to the DC network can be reduced to a level below the full fault current level. Not only does this protect loads in the DC network from a potentially very high fault current, it can provide an opportunity to perform protective measures, e.g., the opening of circuit breaking components (e.g., mechanical or semiconductor contactors or circuit breakers) in the DC network, whilst the network is subject to zero or low current. This may reduce problems associated with e.g., contactor arcing which can occur when components are actuated in high current conditions. Furthermore, the ability to control the DC side fault current may be particularly advantageous when a variable voltage and/or variable frequency generator (e.g., a permanent magnet generator) is employed as the fault current produced by the converter operating as an uncontrolled diode rectifier may vary significantly with generator shaft speed.

The first branch may further include a first diode in parallel with the first bi-directional MOSFET and the second branch may further include a second diode in parallel with the second bi-directional MOSFET. The parallel diodes may be separate from the bi-directional MOSFETs. Alternatively, the diodes may be body diodes of the bi-directional MOSFETs. Those skilled in the art will understand the term "body diode" to be the diode character inherent to a MOSFET, which can effectively be considered to be a diode connected in parallel with the switchable conduction path between the source and drain of the MOSFET. Thus, where separate diodes are included, it will be appreciated the MOSFET body diodes will inherently still be present.

The controller may be configured, responsive to the determination, to control the switching of the first and second MOSFETs of each phase leg to repeatedly switch the converter between the crow-bar configuration and a rectifier configuration in which current from the electrical machine does flow to the DC network. In this case the time spent in the crow-bar configuration, during which time current is contained within the converter (e.g., within one half of the bridge of a bridge-configured converter) reduces the time-averaged current supplied to the DC network to a level greater than zero but less than the full fault current level.

The controller may be configured to modulate a pulse width modulation control parameter of a pulse width modulation signal used to control the repeated switching of the converter between the crow-bar configuration and a rectifier configuration. For example, a frequency and/or pulse width (i.e., duty cycle) of a PWM signal used to control the switching of the transistors may be adjusted to control (e.g., reduce) the level of current supplied to the DC network.

Responsive to the fault, the controller may be configured to control the switching of the first and second bi-directional MOSFETs of each phase leg so that current flowing through the first branch of the phase leg is conducted through the first bi-directional MOSFET in a first direction and current flowing through the second branch of the phase leg is conducted through the second bi-directional MOSFET in a second direction opposite to the first direction. In other words, following the fault, the converter may be controlled to operate in a synchronous rectification mode of operation which utilises the bi-directional current carrying capability of the MOSFETs. In this mode one of the first and second MOSFETs carries current in a first direction and the other MOSFET carries current in a second direction opposite the first direction.

During normal operation of the electrical power system, the controller may be configured to control the switching of the first and second bi-directional MOSFETs of each phase leg so that current flowing through the first branch of the phase leg is conducted through the first bi-directional in a first direction and current flowing through the second branch of the phase leg is conducted through the second bi-directional MOSFET in a second direction opposite to the first direction. In other words, the converter may also be operated in the synchronous rectification mode during normal operation.

Alternatively, during normal operation of the electrical power system, the controller may be configured to control the switching of the first and second bi-directional MOSFETs of each phase leg so that current flowing through the first branch of the phase leg is conducted through the first diode in a first direction and current flowing through the second branch of the phase leg is conducted through the second bi-directional MOSFET in a second direction opposite to the first direction. In other words, during normal operation, the converter may be controlled so as to operate without making use of the bi-directional current carrying capability of the MOSFETs. Instead, one of the two MOSFETs may be used to carry current in one direction and the diode associated with the other of the two MOSFETs may be used to carry current in the opposite direction.

The electrical machine and the converter of the electrical power system may satisfy the inequality:

$$\frac{V_F}{R_{DS-ON}} > I_{FAULT-MAX}$$

In this inequality $V_F$ is a forward voltage drop of the first diode, $R_{DS-ON}$ is an on-state resistance of the second MOSFET, and $I_{FAULT,MAX}$ is a maximum rated current outputtable by the electrical machine when there is zero voltage across its terminals. By designing the system to satisfy this inequality it can be guaranteed that the parallel diodes, which in the presence of the DC network fault are not subject to the usual reverse-biasing voltage from the DC network, do not prevent commutation of the current between the two branches of the phase leg. It is noted that the forward voltage drop of the second diode may or may not be the same as that of the first diode. Likewise, the on-state resistance of the first MOSFET may or may not be the same as that of second MOSFET.

Those skilled in the art will appreciate that the forward voltage drop of the diodes ($V_F$) and the on-state resistances of the MOSFETs ($R_{DS-ON}$) are well-known and readily measurable parameters whose values vary between components depending on, for example, selection of materials and material parameters (e.g., semiconductor doping). Thus, components with suitable values of $V_F$ and $R_{DS-ON}$ can be selected as necessary to satisfy the inequality.

$I_{FAULT, MAX}$ will depend on the maximum rated terminal voltage of the electrical machine and the machine's impedance. The machine's impedance, which is readily measured and can also be calculated through modelling, can be controlled through design (e.g., selection of stator tooth tip opening and shape (e.g., tapering) to control magnetic saturation in the tooth tip regions, slot depth to control cross-slot leakage flux, end-winding design, slot wedge design, axial length, stator and rotor core back thickness, turn number and the like). A relatively high impedance may intentionally be designed into the electrical machine to limit the maximum fault current. The maximum rated terminal voltage will depend on the machine design and the machine's maximum rated speed (as terminal voltage increases with speed), the latter of which is a common design parameter/constraint of the electric machine. The maximum speed may be selected based on, for example, a predefined maximum speed of the drive shaft to which the rotor of the electrical machine is to be coupled.

The electrical power system may further comprise a filter for smoothing a waveform of the current supplied to the faulted DC electrical network. The filter may be a low-pass filter.

For each phase leg, the first branch may be connected between a phase connection of the electrical machine and a first DC output of the converter, and the second branch may be connected between the phase connection of the electrical machine and a second DC output of the converter. The first and second DC outputs of the converter may be connected with the DC electrical network.

The first and second bi-directional MOSFETs may be wide band gap (WBG) MOSFETs, for example silicon carbide (SiC) MOSFETs.

The electrical machine may be of any suitable type. The electrical machine may for example be a permanent magnet machine, a switched reluctance machine or a wound field machine.

The electrical machine may have a plurality of phases; and the power electronics converter may comprise a phase leg for each one of the plurality of phases of the electrical machine. Any number of phases greater than or equal to two may be used. In one specific example the number of phases is three, and in another specific example the number of phases is four.

According to a second aspect, there is provided a method of operating an electrical power system comprising an electrical machine operable to output AC, a DC electrical network and a power electronics converter connected between the AC output of the electrical machine and the DC electrical network. The power electronics converter comprises, for each phase of the output AC, a phase leg comprising a first branch including a first bi-directional MOSFET and a second branch including a second bi-directional MOSFET. The method comprises: in a first mode of operation corresponding to normal operation of the electrical power system, controlling switching of the first and second bi-directional MOSFETs of each phase leg so that current is commutated between the first and second branches of the phase leg to rectify the AC input to DC to supply the DC electrical network with DC electrical power; and in a second mode of operation corresponding to operation with a fault in the DC electrical network, controlling switching of the of the first and second MOSFETs of each phase leg to switch the converter into a crow-bar configuration in which current from the electrical machine does not flow to the DC network.

The second mode of operation may comprise controlling switching of the of the first and second MOSFETs of each phase leg to repeatedly switch the converter between the crow-bar configuration and a rectifier configuration in which current from the electrical machine does flow to the DC network.

The second mode of operation may further comprise modulating a pulse width modulation control parameter of a pulse width modulation signal used to control the repeated switching of the converter between the crow-bar configuration and a rectifier configuration.

The method may further comprise, after entering the second mode of operation, controlling the opening of one or more circuit breakers or contactors in the DC electrical network. By opening the contactor after controlling the level of current, problems such as contactor arcing can be reduced. Such problems may be particularly reduced if the opening is performed at zero current, e.g., when the converter is in the crow-bar configuration.

In the second mode of operation, the switching of the first and second bi-directional MOSFETs of each phase leg is controlled so that current flowing through the first branch of the phase leg is conducted through the first bi-directional MOSFET in a first direction and current flowing through the second branch of the phase leg is conducted through the second bi-directional MOSFET in a second direction opposite to the first direction.

According to a third aspect, there is provided a controller for an electrical power system configured to: in a first mode of operation corresponding to normal operation of the electrical power system, control switching of a first bi-directional MOSFET of a first branch of a phase leg of a power electronics converter and a second bi-directional MOSFET of a second branch of the phase leg of the converter so that current is commutated between the first and second branches of the phase leg to rectify an AC input from an electrical machine to DC to supply a DC electrical network with DC electrical power; and in a second mode of operation corresponding to operation with a fault in the DC electrical network, controlling switching of the of the first and second MOSFETs of the phase leg to switch the converter into a crow-bar configuration in which current from the electrical machine does not flow to the DC network.

The controller may be implemented as a single controller or multiple separate (e.g., distributed) controllers. Thus, the controller may be or may form part of a control system. The controller may be implemented in software, hardware or a combination of the two. The controller may be or may be a functional module of an Engine Electronic Controller (EEC) or a Full Authority Digital Engine Controller (FADEC).

According to a fourth aspect, there is provided an aircraft power and propulsion system comprising: a gas turbine engine; and an electrical power system according to the first aspect. The electrical machine of the electrical power system is mechanically coupled with a spool of the gas turbine engine. The power electronics converter may be a unidirectional AC to DC converter (i.e., a rectifier) or a bidirectional AC-DC converter capable of operating as either a rectifier or an inverter depending on an operating mode of the electrical machine.

According to a fifth aspect, there is provided an aircraft comprising the power and propulsion system of the fourth aspect. The aircraft may be a solely gas-turbine-powered aircraft (e.g., a more electric aircraft) or a hybrid electric aircraft.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
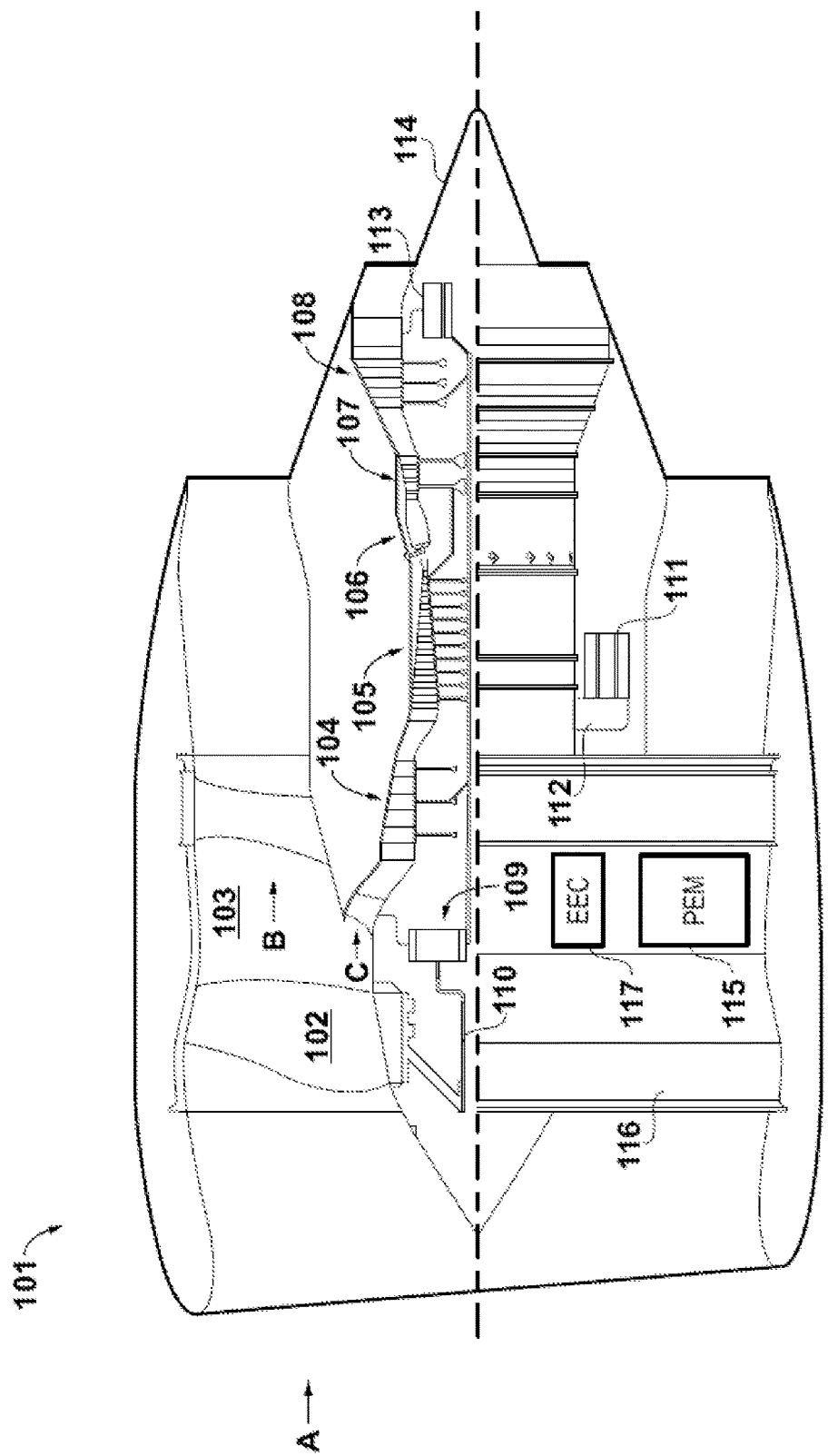
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 111 coupled with the high pressure spool and a second rotary electrical machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electrical machine 111 is driven by the high-pressure spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the low- and high-pressure compressors 104 and 105. In FIG. 1, the second electrical machine 113 is mounted in the tail cone 114 of the engine 101 coaxially with the turbomachinery and is coupled to the low-pressure turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and (if present) second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more dc busses. The dc busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electrical machines 111, 113 compared with those of conventional gas turbines.

Figure 2A:
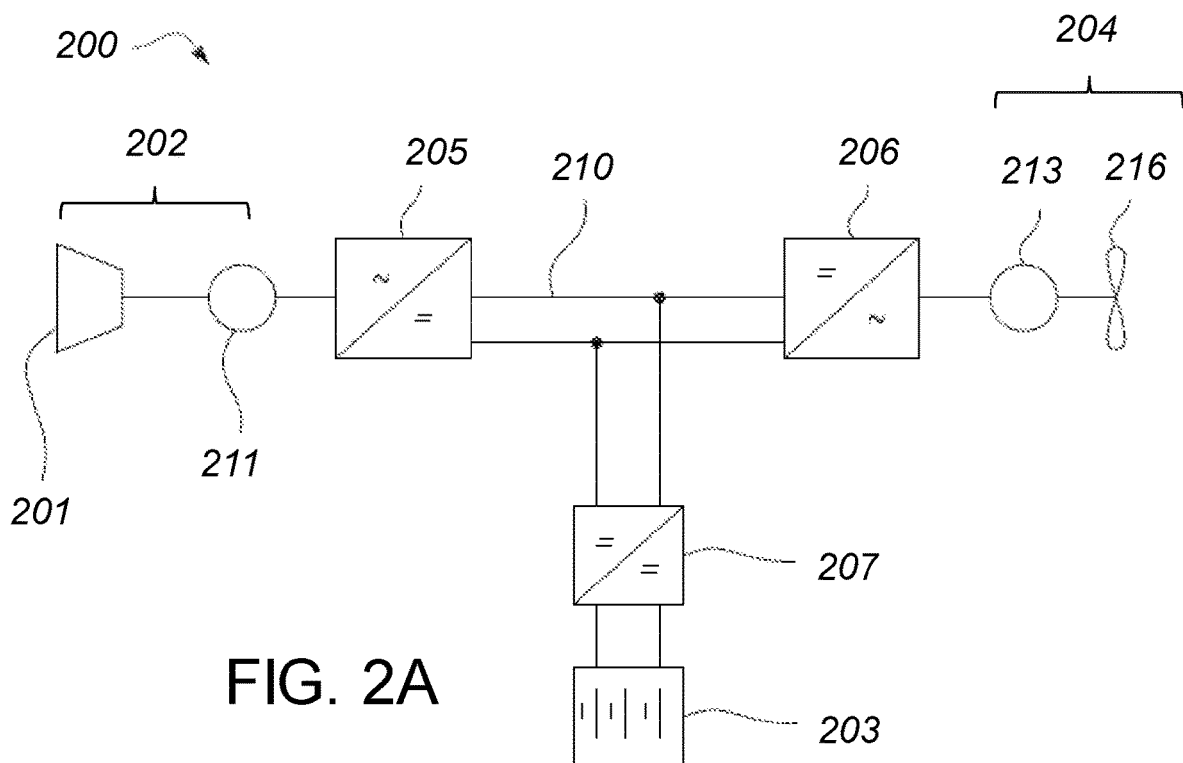
FIG. 2A is a schematic illustration of a hybrid electric aircraft propulsion system.
Figure 2B:
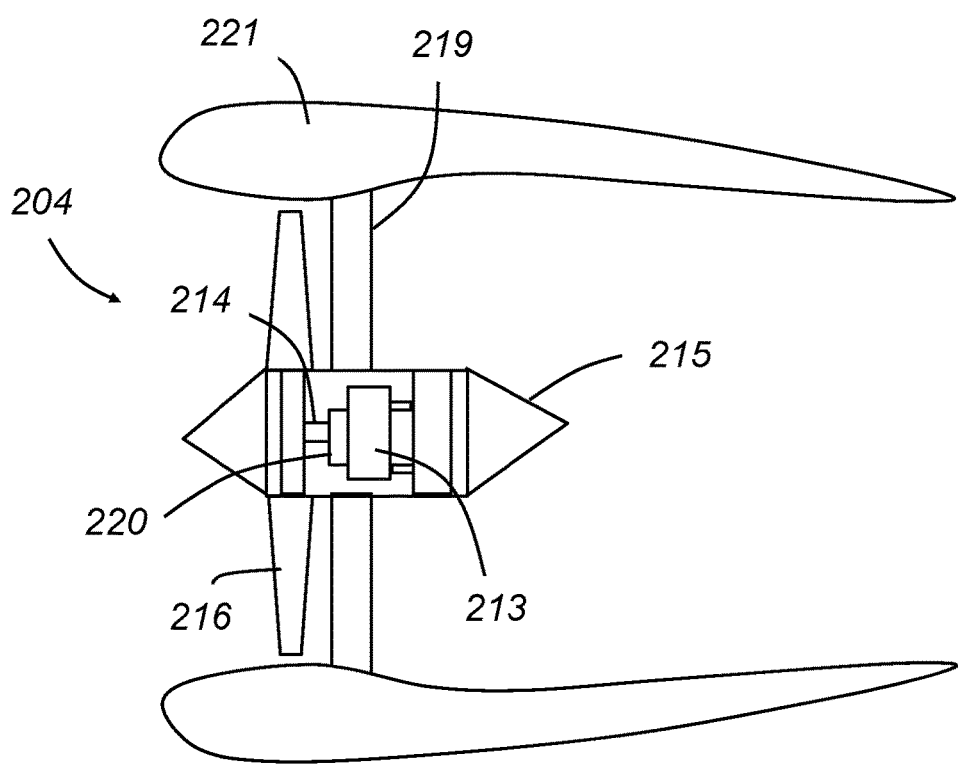
FIG. 2B illustrates an electrically powered propulsor such as may be used in a hybrid electric propulsion system.

FIGS. 2A and 2B

FIG. 2A illustrates an exemplary propulsion system 200 of a hybrid electric aircraft. The propulsion system 200 includes a generator set 202 comprising an engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a dc distribution bus 210, a DC/AC converter 206 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the engine 201 is coupled to and drives the rotation of a shaft of the generator 211 which thereby produces alternating current. The AC/DC converter 205, which faces the generator 211, converts the alternating current into direct current which is fed to various electrical systems and loads via the dc distribution bus 210. These electrical systems include non-propulsive loads (not shown in FIG. 2A) and the motor 213 which drives the propulsor 204 via the DC/AC converter 206.

The battery pack 203, which may be made up of a number of battery modules connected in series and/or parallel, is connected to the dc distribution bus 210 via the DC/DC converter 207. The DC/DC converter 207 converts between a voltage of the battery pack 203 and a voltage of the dc distribution bus 210. In this way, the battery pack 203 can replace or supplement the power provided by the generator set 202 (by discharging and thereby feeding the DC distribution bus 210) or can be charged using the power provided by the generator set 202 (by being fed by the dc distribution bus 210).

Referring to FIG. 2B, in this example the propulsor 204 takes the form of a ducted fan. The fan 216 is enclosed within a fan duct 219 defined within a nacelle 221, and is mounted to a core nacelle 215. The fan 216 is driven by the electrical machine 213 via a drive shaft 214, both of which may also be thought of as components of the propulsor 204. In this embodiment a gearbox 220 is provided between the electrical machine 213 and the drive shaft 214.

The electrical machine 213 is supplied with electric power from a power source, for example the generator set 202 and/or the battery 203 via the dc bus 210. The electrical machine 213 of the propulsor, and indeed the electrical machine 211 of the generator set 202, may be of any suitable type, for example of the permanent magnet synchronous type.

Those skilled in the art will recognise the propulsion system 200 of FIGS. 2A-B to be of the series hybrid type. Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electrical machines. For example, the electrical machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

Those skilled in the art will also appreciate that the hybrid architecture illustrated in FIG. 2A is only one example, and other architectures are known and will occur to those skilled in the art.

FIGS. 3A-B

Figure 3A:
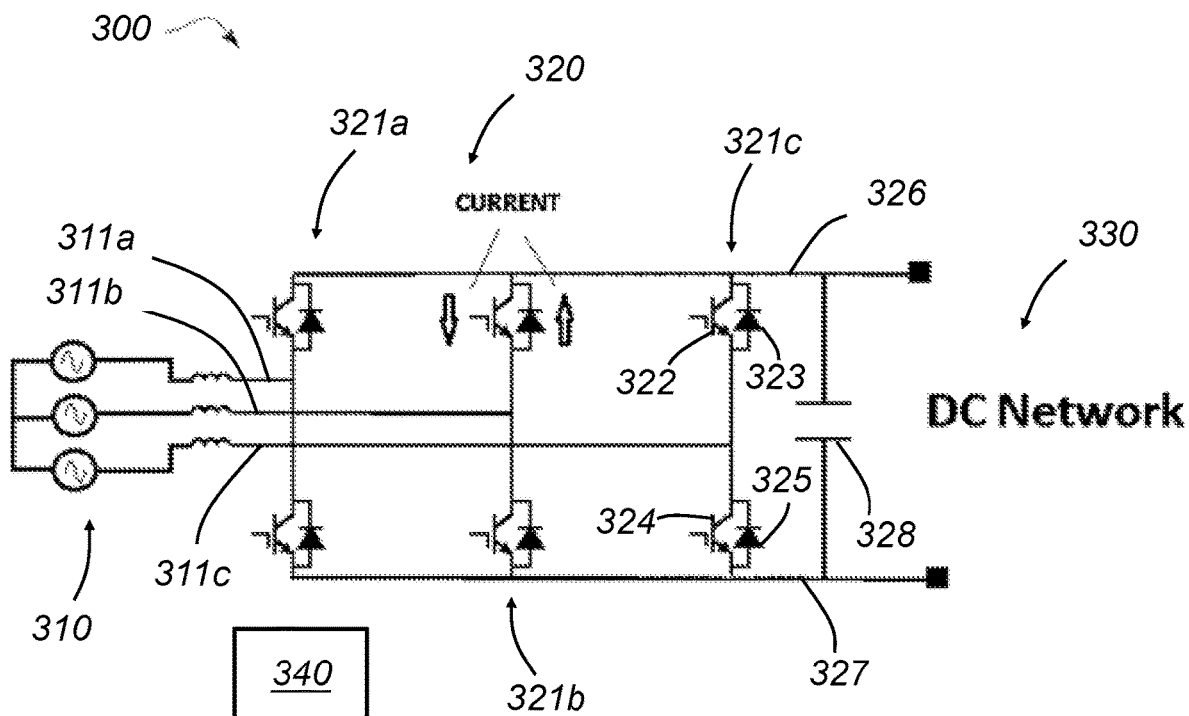
FIG. 3A illustrates a portion of an exemplary electrical power system in which an AC-DC converter connects a 3-phase electrical generator with a DC network.

FIG. 3A illustrates a portion of an electrical power system 300 such as may be used in the aircraft and engine systems described above with reference to FIG. 1 and FIGS. 2A-B. The electrical power system 300 includes an electrical machine 310 operable as a generator to generate AC, an AC-DC power electronics converter 320 operable to rectify the AC received from the electrical machine 310 and output DC, a DC electrical network 330 which receives the DC power output by the converter 320, and a controller 340 which exercises control over the electrical power system 300 including the converter 320.

In this example the electrical machine 310 is a three-phase machine which outputs its three phases through three phase connections 311a, 311b, 311c. It will however be understood that other numbers of phases (e.g., four) and other connection arrangements could be used. The electrical machine 310 can be of any type and configuration suitable for the application requirements. In one specific embodiment it is a permanent magnet synchronous machine (PMSM) of radial flux configuration, but other types of machine including wound field and switched reluctance, and other configurations such axial flux and transverse flux, are also contemplated. The electrical machine 310 may be specifically configured as a generator, or it may be operable in both motor and generator modes (e.g., where the electrical machine 310 is a 'starter-generator' of a gas turbine engine).

The illustrated power electronics converter 320 is a two-level, three-phase full-bridge rectifier with insulated gate bipolar transistors (IGBTs). It includes three phase legs 321a, 321b, 321c, each of which is connected to a corresponding one of the phase connections 311a, 311b, 311c from which it receives AC. Each phase leg 321a, 321b, 321c includes two branches: a first (upper) branch which includes a transistor 322 and associated diode 323 connected in anti-parallel with the transistor 322 and a second (lower) branch which includes a transistor 324 and associated diode 325 connected in anti-parallel with the transistor 324. The upper branch of each phase leg 321a, 321b, 321c is connected with a first DC output 326. The lower branch of each phase leg 321a, 321b, 321c is connected with a second DC output 327. The first and second DC outputs 326, 327 connect with the DC electrical network 330, whereby the DC electrical network 330 is supplied with DC electrical power. A DC link capacitor 328 is also shown, the function of which will be familiar to those skilled in the art of power electronics.

During normal operation of the converter 320 as a rectifier, the controller 340 uses pulse width modulation to control the switching of the transistors to commutate current between the upper and lower branches of the phase legs to affect suitable rectification of the AC to DC. In this example, when current flows through the upper branch of a phase leg to the first output 326 it flows through the diode 322, whereas when current flows through the lower branch of the phase leg to the second output 327 it flows through the transistor 324.

Figure 3B:
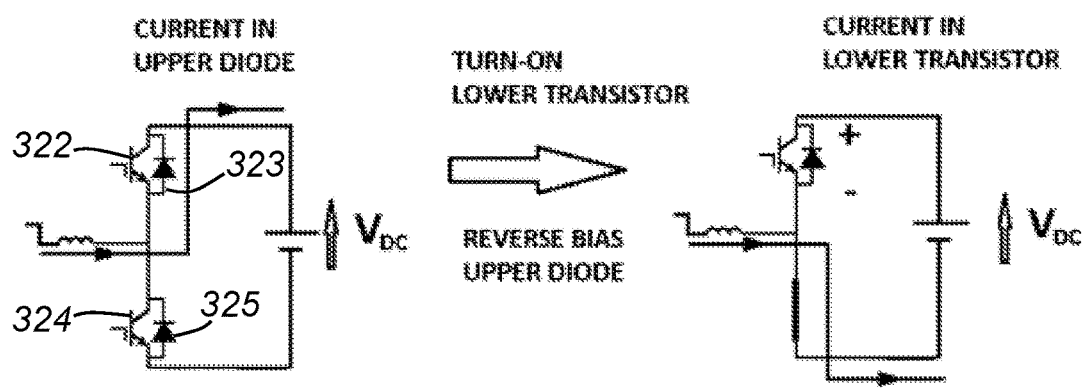
FIG. 3B illustrates how current is switched between the upper and lower branches of a phase leg of the converter to rectify AC to DC.

FIG. 3B shows, for one phase leg, the normal process of commutating from an upper diode 323 to a lower transistor 324. Initially current is flowing through the upper leg through the upper diode 323. By turning on the lower transistor 324 (as in the right-hand circuit), the DC side voltage is imposed across the conducting diode 323 in a reverse direction, which acts to turn off the diode 323 allowing conduction through the lower transistor. Thus, it can be seen that the DC side voltage is instrumental in commutating the diode 323 to its non-conducting state to permit commutation of the current to the lower branch.

FIG. 4

Figure 4:
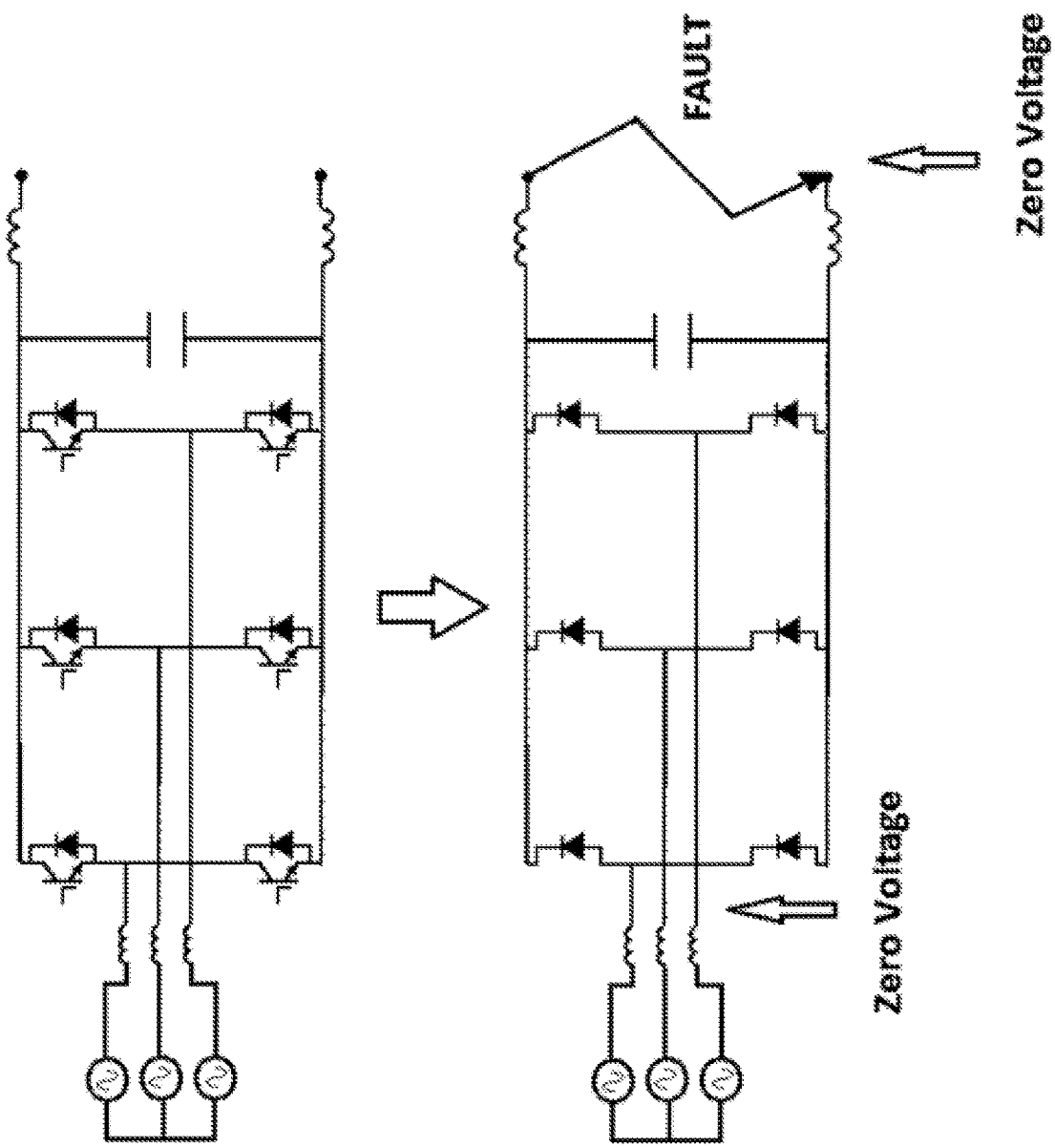
FIG. 4 illustrates the effect of a DC network fault on an AC-DC converter.

FIG. 4 illustrates the effect of a DC network fault (e.g., a fault in a load connected in the DC network which places a low impedance across the DC network terminals) on the operation of the electrical power system 300.

Following a fault in the DC network 330 the DC-side voltage collapses, possibly to zero Volts though in general the fault may have some resistance in which case the voltage may not collapse all the way to zero. The significance of this is that there is no voltage (or more generally only a small voltage) available to reverse bias the conducting diode (e.g., diode 323 in FIG. 3B) to turn it off. If the voltage is not large enough (and in general this cannot be guaranteed), the converter loses the ability to commutate current between the upper and lower branches of the phase legs 321a, 321b, 321c.

Another effect of the DC network fault is that the fault current supplied to the DC network 330 will be controlled almost exclusively by the voltage generated by the electrical machine 310 and the machine's impedance. The fault current supplied to the DC network 330 via the converter 320 will therefore typically be very large. For example, even for a 3-phase generator deliberately designed to have a high reactance to limit the output fault current of each phase to 500 $A_{RMS}$, the DC fault current contributed by 3-phases acting together would be approximately 707 A and would also contain a significant ripple component.

In view of the high fault current, it is common to switch off the active transistors in the event of a DC network fault, to protect them from over-current stress. This leaves the converter configuration illustrated in the lower circuit of FIG. 4: the converter 320 will operate as an uncontrolled diode rectifier. Briefly referring to FIG. 7, this illustrates the 3-phase generator current output by the generator 310 and also the waveform of the fault current supplied to the DC network 330 in the uncontrolled rectifier mode of operation.

In some systems the uncontrolled diode rectifier mode of operation is acceptable because the converter 320 is at least supplying current to the network 330. In other systems, however, in particular safety-critical aerospace systems, it would be highly desirable to have additional control over the level of current supplied to the DC network 330 following the fault.

FIGS. 5A-B

Figure 5A:
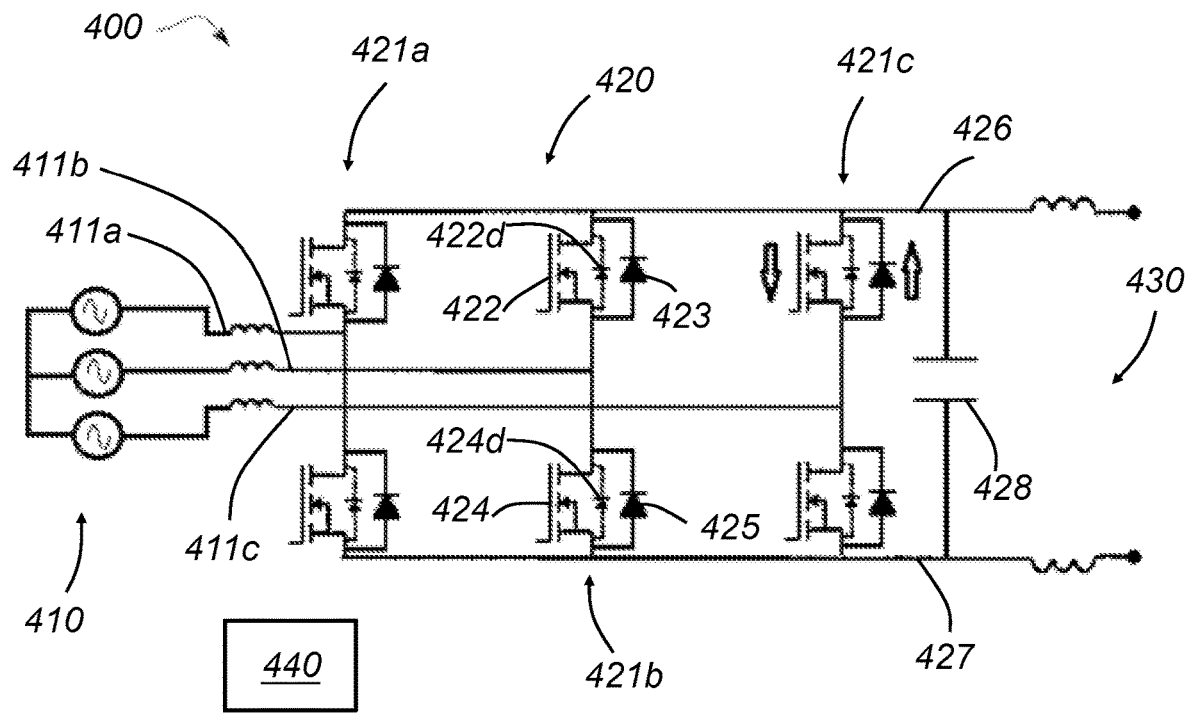
FIGS. 5A-B illustrate electrical power systems in which the AC-DC converter includes bi-directional MOSFETs.
Figure 5B:
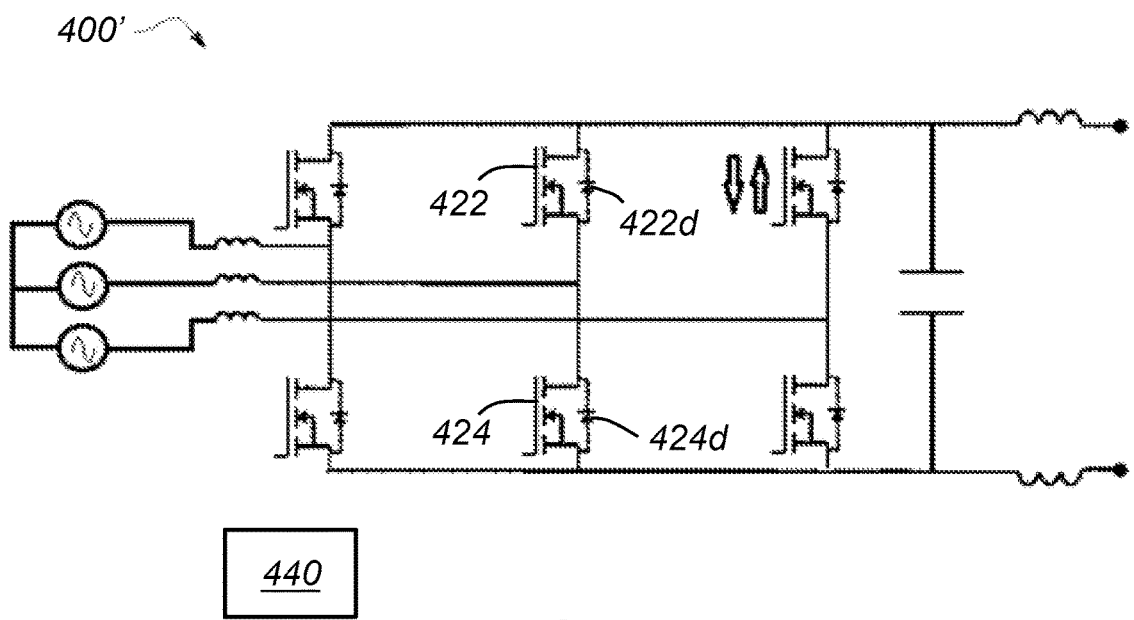

In accordance with the present invention, FIGS. 5A and 5B illustrate electrical power systems 400, 400' identical to the electrical power system 300 of FIG. 3A except that the IGBTs 322, 324 of each converter phase leg are replaced with bi-directional MOSFETs 422, 424. The MOFETs are preferably wide-bandgap MOSFETs comprising Silicon Carbide (SiC), though other suitable materials such as Gallium Nitride (GaN) or Gallium Arsenide (GaAs) could be used instead.

As will be understood by those skilled in the art, MOSFETs inherently have a diode character. This is usually referred to as the "body diode" or "weak body diode" of a MOSFET, and it is common to illustrate the body diode in a circuit illustration of a MOSFET. In FIGS. 5A and 5B the body diodes 422d, 424d of the two MOSFETs 422, 424 of each phase leg 421a-c are shown connected in parallel with the main transistor element of the MOSFET 422, 424 which provides a bi-directional switchable conduction path between the source and drain terminals.

In the electrical power system 400 of FIG. 5A, each branch of each phase 421a-c includes, in addition to its MOSFET 422, 424 and associated body diode 422d, 424d, an additional separate diode 423, 425. In contrast, the electrical power system 400' of FIG. 5B omits the separate diodes 423, 425 and instead retains only the inherent body diodes 422d, 424d of the MOSFETs 422, 424. Both arrangements are in accordance with the present invention. Omitting the separate diodes 423, 425 will be understood to be advantageous in terms of reducing component count and system mass. However, in general it may be more preferable to retain the separate diodes 423, 425 as the inherent body diodes 422d, 424d are typically comparatively limited in terms of e.g., current carrying capability, turn-on and turn-off times and thus switching frequency, and on-state voltage drop.

Normal operation of the electrical power systems 400, 400', i.e., operation without a DC network fault, will now be described.

The system 400 of FIG. 5A, which includes additional diodes 423, 425, can be operated in essentially the same way as described above with reference to FIG. 3B for the electrical power system 300. Specifically, the controller 440 uses PWM control signals to commutate current between the diode 423 of the upper branch of each phase leg 421a-c and the transistor (MOSFET) 424 of the lower branch of each phase leg. The DC network provides the voltage required to reverse bias the upper diodes 423 to allow this commutation of current. It will be understood that this mode of operation does not make use of the bi-directional current carrying capability of the MOSFETs 422, 424.

The system 400' of FIG. 5B can be operated in much the same way, with the body diodes 422d, 424d taking on the role of the diodes 423, 425 of FIG. 5A. That is, current can be commutated between the upper body diode 422d of the upper branch of each phase leg 421a-c and the MOSFET 424 of the lower branch of each phase leg. However, the body diodes 422d, 424d generally have a lower current carrying capability, a lower switching frequency and a higher on-state voltage drop than separate diodes 423, 425, so this mode of operation of the system 400' may be undesirable except during less demanding operation.

Thus, an alternative mode of operation is illustrated in FIG. 5B, which makes use of the bi-directional current capability of the MOSFETs 422, 424. In this mode—which may be termed the "synchronous rectification" mode—the body diodes 422d, 424d are not used to conduct the current. Instead, current is commutated between the upper branch MOSFET 422 conducting in a first direction (in this case the 'reverse' direction of the MOSFET 422) and the lower branch MOSFET 424 conducting in a second opposite direction (in this case the 'forward' direction of the MOSFET 424). In some embodiments the controller 440 may switch between the two modes depending on the operating conditions of the power system 400'. For example, at lower operating currents (which may correspond to light loading of the DC network) the controller 440 may control the converter 420 to commutate current between the body diodes 422d, 424d and MOSFETs 422, 424, but switch to synchronous rectification mode once the operating current exceeds a predetermined limit.

It should be appreciated that the electrical power system 400 of FIG. 5A can also be operated in the synchronous rectifier mode, i.e., bi-directional conduction of the MOSFETs 422, 424 without conduction through the separate diodes 423, 425. However, higher switching frequencies may be attainable using the diodes 423, 425 so synchronous rectification may be less desirable in this system 400.

FIGS. 6A-C

Figure 6A:
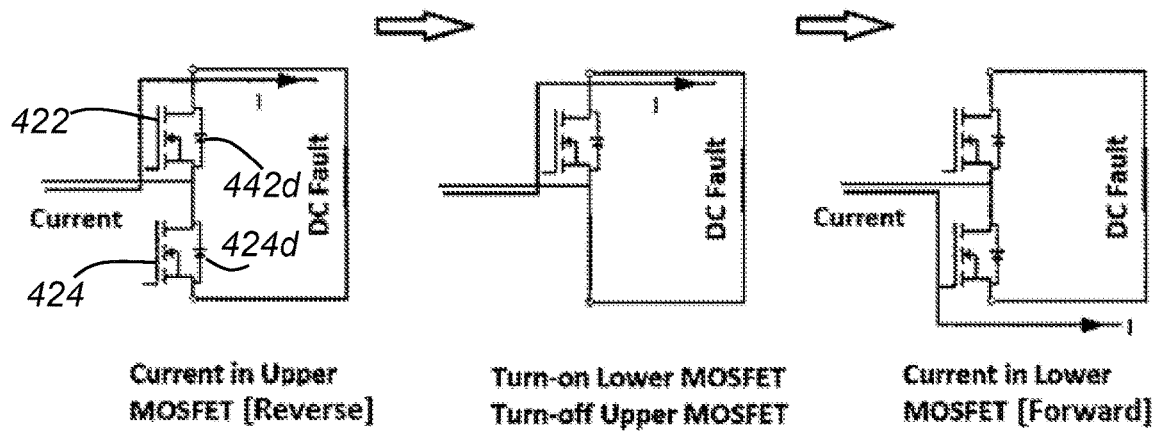
FIGS. 6A-C illustrate the operation of the electrical power systems of FIGS. 5A-B in the presence of a fault in the DC electrical network.
Figure 6B:
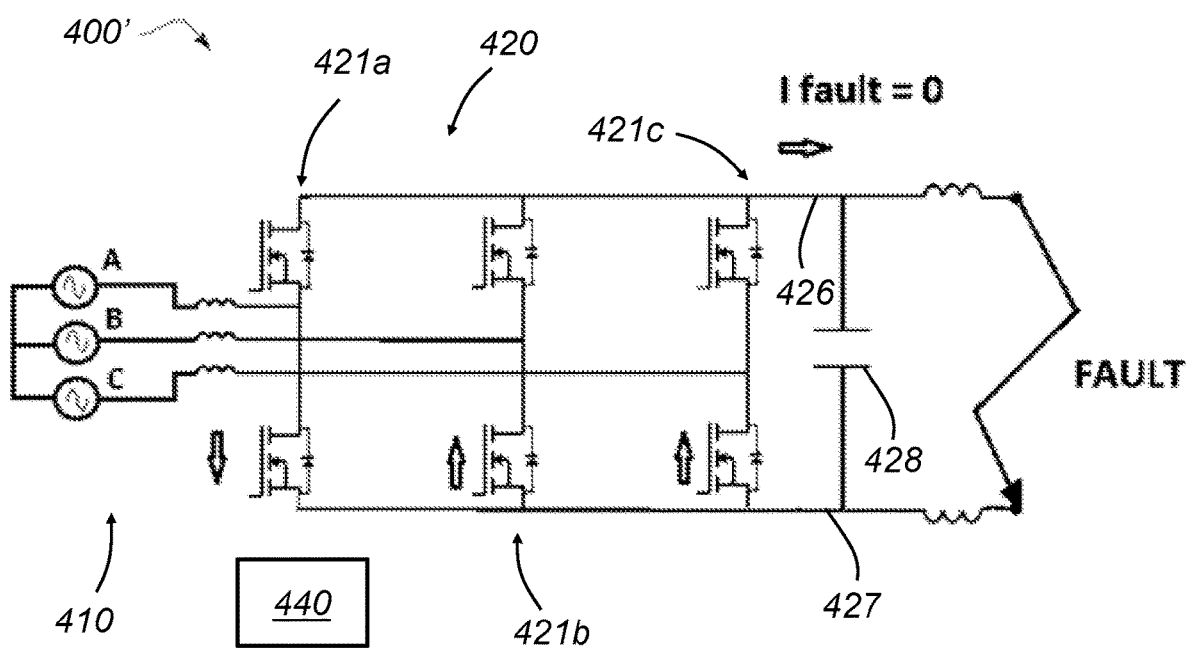
Figure 6C:
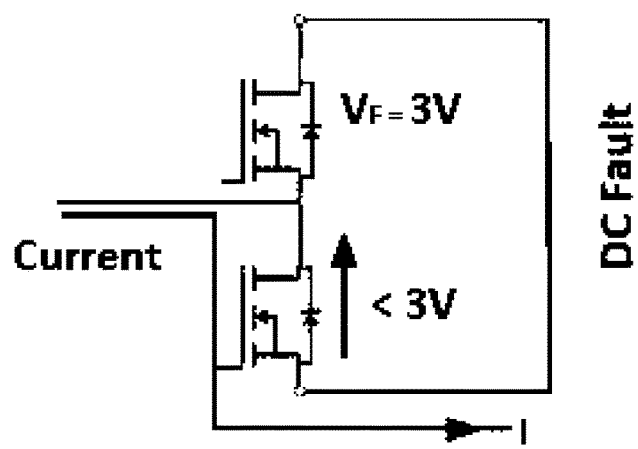

FIGS. 6A-6C illustrate how the electrical power systems 400, 400' may be controlled in response to a fault in the DC electrical network 430. Although the minimal converter topology 400' is shown in FIGS. 6A-6C, it should be appreciated that the following description may also be applied to the converter topology 400 which additionally includes the separate diodes 423, 425.

As described above with reference to FIGS. 3A-3C and FIG. 4, a fault in the DC network will generally result in the DC-side voltage collapsing. This results in a loss of the diode-biasing voltage, which causes the converter to enter the uncontrolled diode rectifier mode shown in the lower circuit of FIG. 4. The same applies to the MOSFET-based electrical power systems 400, 400' of FIGS. 5A-5B: when a DC network fault occurs, the body diodes 422*d*, 424*d* and/or the separate diodes 423, 425 are not subject to the biasing voltage which is ordinarily leveraged to commutate current between the upper and lower branches of the phase legs 421*a-c*.

However, by utilising MOSFETs 422, 424 with high current carrying bi-directional current carrying capabilities, it remains possible to commute current between the upper and lower branches. Specifically, even in the absence of a biasing voltage which turns off the forward conduction of the e.g., upper diode(s) 422*d*, 423, current can flow through the e.g., upper MOSFET 422 in the reverse direction because of its superior current carrying capability. This is illustrated in FIG. 6A. In the first circuit, the converter 420 of the electrical power system 400' is operating in the synchronous rectification mode when a DC network fault occurs. Rather than entering the uncontrolled rectifier state in which current would flow through the body diodes 422*d*, 424*d*, current can still be commutated to the MOSFET 424 of the lower branch. This is illustrated in the second and third circuits of FIG. 6A.

Referring to FIG. 6B, following the fault in the DC network 430 and using the retained ability to commutate the current between the branches, the controller may control the switching of the MOSFETs 422, 424 to switch the converter into a crow-bar configuration such as the one shown in FIG. 6B. In the crow-bar configuration no current can flow from the electrical machine 410 to the DC network 430, as it instead contained within the machine and converter. Thus, the fault current conducted to the DC network can, at least temporarily, be reduced to zero.

It will be appreciated that FIG. 6B illustrates a crow-bar configuration in which current is conducted through the lower set of MOSFETs 424 such that current is contained in the lower half of the converter bridge. Alternatively, a crow-bar configuration in which current is conducted through the upper set of MOSFETS 422 could be used, or indeed the controller 440 may switch the converter 420 between these two configurations.

FIG. 6C illustrates a condition for ensuring that the current can be successfully commutated between the upper and lower MOSFETS 422, 424 in the absence of a DC-side voltage suitable for biasing the diodes 422*d*, 424*d*. It is again noted that FIG. 6C shows the minimal converter topology as an example, and that the following description could equally be applied to the converter topology with separate diodes 423, 425.

Referring to the transition illustrated in the second and third circuits of FIG. 6A, this will only occur if the upper body diode 422*d* does not conduct the current. This requires that the voltage generated across the lower MOSFET 424 due to current flowing in a forward direction must be lower than the forwards voltage drop ($V_F$) of the upper body diode 422*d*. In the illustrated example, $V_F=3V$. Thus, to ensure current is commutated to the lower MOSFET 424, it is necessary that the voltage drop caused by the current and on-state resistance ($R_{DS-ON}$) of the MOSFET 424 remains below 3V. Consider the example where $R_{DS-ON}$ is 1.0 mΩ, which is a reasonable value for a modern SiC-based MOSFET. In this case the voltage drop will be below $V_F=3V$ provided that the fault current from the electrical machine 410 does not exceed $V_F/R_{DS-ON}=3,000$ A. Thus, provided by the maximum rated fault current ($I_{FAULT}$, MAX) that can be output by the electrical machine 410 in the limit where there is zero voltage across the terminals of the electrical machine 410 (as could be the case where there a fault in the DC network 430) is no greater than 3,000 A, the fault current can always be commutated between the upper and lower branches of the converter 420.

More generally, current can always be commutated provided that the electrical machine 410 and converter 420 satisfy the equality:

$$\frac{V_F}{R_{DS-ON}} > I_{FAULT-MAX}$$

As noted above, $V_F$ is the forward voltage drop of the upper diode 422*d* (or 423), $R_{DS-ON}$ is an on-state resistance of the lower MOSFET 422, and $I_{FAULT,MAX}$ is a maximum rated current that can be output by the electrical machine 410 when there is zero voltage across its terminals. The forward voltage drop of the lower diode 424*d* (or 425) will generally be the same as that of the upper diode 422*d* (or 423), and the on-state resistance of the upper MOSFET 422 will generally be the same as that of the lower MOSFET 422.

The values of $V_F$ and $R_{DS-ON}$ vary between diodes and MOSFETs depending on component material, size, semiconductor doping and the like, and thus diodes and MOSFETs can be selected to satisfy the above inequality. $I_{FAULT,MAX}$ depends on the maximum terminal voltage of the electrical machine 410 and the impedance of the electrical machine 410. The maximum terminal voltage depends on the design of the machine and the maximum rated speed of the machine 410, the latter of which is usually a design constraint. For example, the maximum speed may be the maximum rated speed of an engine drive shaft where a direct drive arrangement is used, or a gear ratio of the maximum rated speed of the engine drive shaft where a gearing arrangement is used. The impedance also depends on the machine design and to some extent can be controlled, for example by intentionally designing an electrical machine with a high reactance and thus a relatively high impedance to limit the maximum fault current. Thus, it is possible to design a system which satisfies the above inequality.

It should be appreciated that it is not essential that the electrical power systems 400, 400' described herein satisfy the inequality. Specifically, even if the inequality is not satisfied, the voltage drop of the lower MOSFET 424 during conduction may still be lower than $V_F$ for almost the entire operating envelope of the system 400, 400'. For instance, an electric machine 410 directly driven by the HP spool of a gas turbine engine may have a maximum rated speed of 25,000 rpm, and the inequality may not be satisfied above 23,000 rpm. In this case the converter 420 can still be commutated to and from the crow-bar configuration for most of the operating envelope of the system 400, 400'.

FIG. 7

Figure 7:
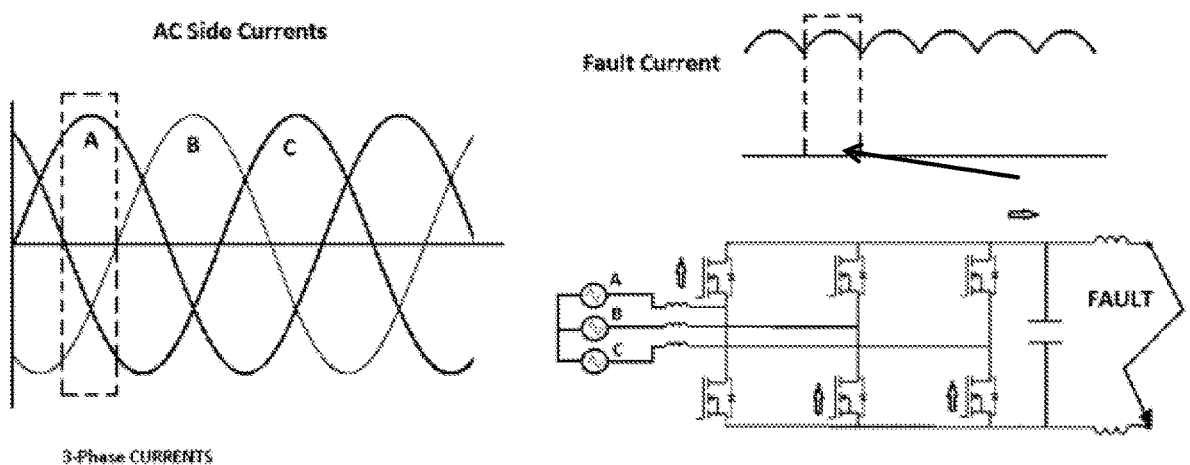
FIG. 7 illustrates the waveform of the fault current which will be supplied to the DC network following a fault, in the uncontrolled diode rectifier mode.

The left-hand graph of FIG. 7 illustrates the 3-phase AC-side current produced by a 3-phase electrical generator 410. The three phases are sinusoidal and offset from each other by 120 degrees. One 60-degree interval of one of the three phases (phase A) is highlighted within the dashed box.

The right-hand graph of FIG. 7 illustrates the corresponding fault current delivered to the DC network 430 when the converter 420 operates as an uncontrolled diode rectifier, i.e., without utilising the invention described herein. The same 60-degree interval is highlighted in the right-hand graph.

FIG. 8

Figure 8:
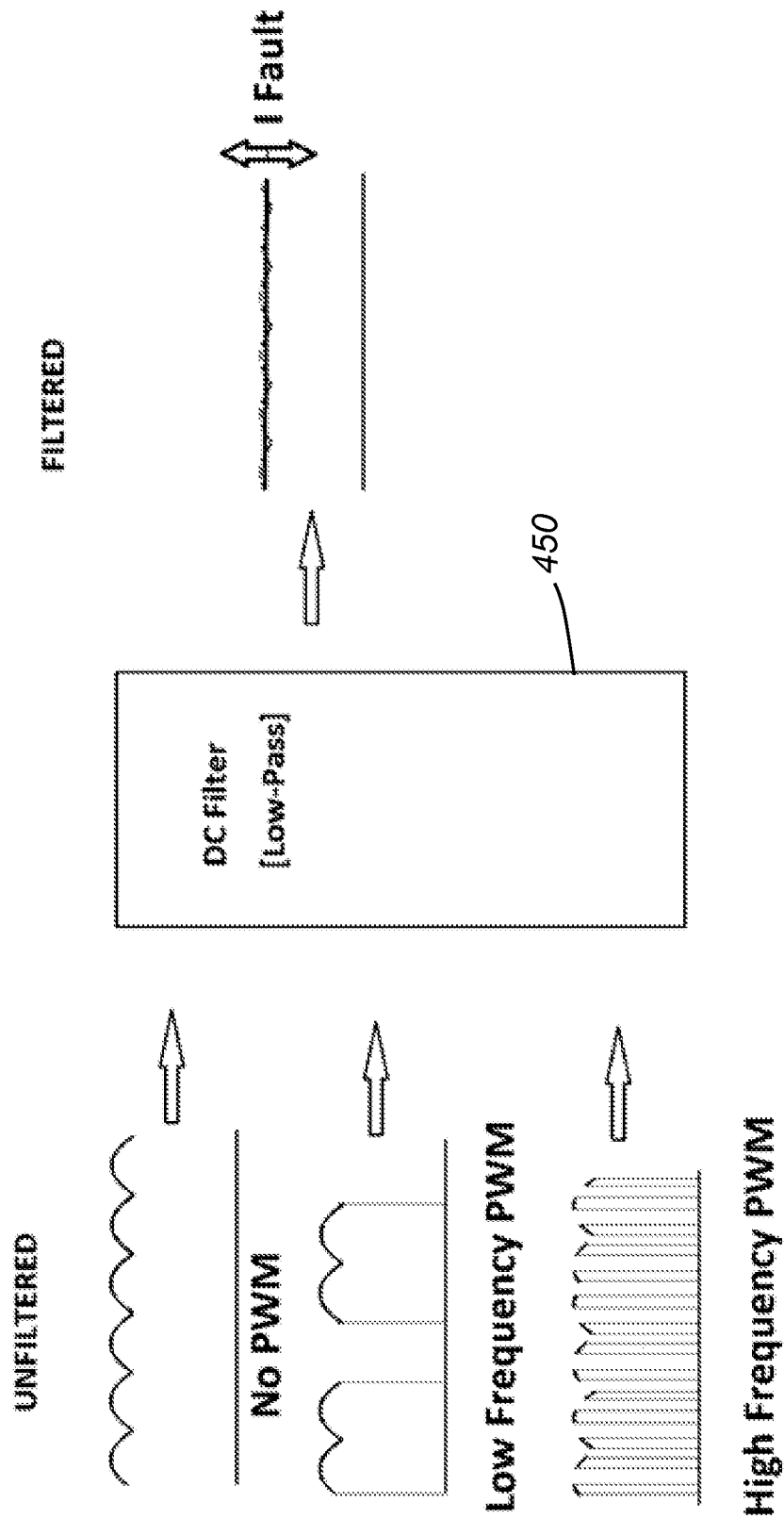
FIG. 8 illustrates how the waveform of the fault current can be modified using the crow-bar configuration, modulation of PWM control parameters and a filter.

FIG. 8 illustrates ways in which the current which is supplied to the faulted DC electrical network 430 may be controlled. By way of reference the top-left waveform of FIG. 8 (labelled "No PWM") is the fault current waveform in the absence of any control (i.e., it corresponds to the right-hand graph of FIG. 7 in which the invention is not utilised).

According to one embodiment, following the fault, the MOSFETs 422, 424 of the converter 420 are switched into the crow-bar configuration shown in FIG. 6B. This results in zero current being supplied to the DC network 430. Supplying zero current to the faulted DC network may be desirable in some instances, for example where circuit breaking components such as DC contactors are to be opened or closed to isolate faults.

In other embodiments, where it is instead preferable to supply some (i.e., not zero) current to the DC network, the controller 440 may repeatedly switch the converter MOSFETs between the crow-bar configuration and a rectifier configuration in which the fault current is supplied to the DC network. In this way the time-averaged current supplied to the DC network will be less than full fault current level because the time spent in the crow-bar configuration will pull the average current down. The rectifier configuration may be the diode rectifier or synchronous rectifier modes described above: in either case the fault current will be supplied to the DC network whilst in the rectifier configuration.

Where the repeated switching approach is taken, the average current and the current waveform will depend on the modulation of the PWM signal used to switch the MOSFETs. The greater the pulse width (equivalently, the greater the duty cycle), the higher the average current will be. The greater the frequency, the more chopped this waveform will be. The latter is illustrated in the second and third left-hand waveforms of FIG. 8 (labelled "low frequency PWM" and "high frequency PWM"). Thus, the PWM control parameters may be selected and varied according to the desired current level and waveform.

Optionally, the current output by the converter 420 can be passed through an existing or dedicated filter 450 (e.g., a low-pass DC filter) to smooth the current waveform supplied to the DC network 430. In the presence of a fault the DC filter 450 may be tuned according to the downstream requirements of the DC network. The unfiltered waveforms are illustrated on the left-hand side of FIG. 8, under the heading "Unfiltered". An exemplary filtered waveform is shown on the right-hand side under the heading "Filtered".

FIG. 9

Figure 9:
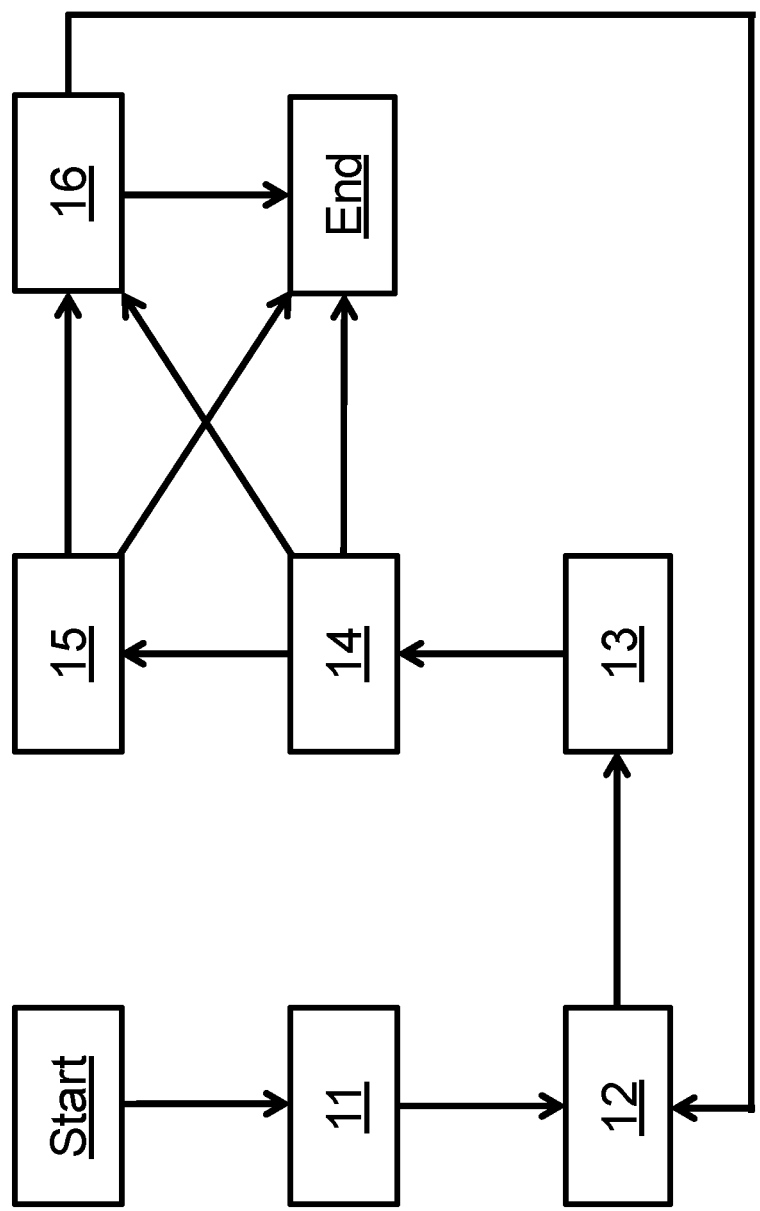
FIG. 9 is a flow chart illustrating a method of controlling an electrical power system.

FIG. 9 is a flow diagram illustrating a method 10 of controlling an electrical power system 400, 400'. The method 10 may be performed by a control system which is or includes the controller 440. The controller 440 may, for example, be an EEC 117 or one or more functional modules of an EEC 117.

At step 11 the electrical power system 400, 400' is operating in a normal condition. The rotor of the electrical machine 410 is being driven to rotate by a shaft, for example a spool of a gas turbine engine, and the machine 410 is generating AC electrical power. The generated AC electrical power is output from the electrical machine to an AC to DC power electronics converter 420. Generally speaking the electrical machine 410 may be a variable speed machine driven to rotate at or at a speed related to the speed of the engine drive shaft, such that the frequency and voltage of the output AC varies.

At step 12, with the electrical power system 400, 400' still operating in the normal condition, the AC to DC converter 420 rectifies the AC to DC and outputs the DC to supply the DC electrical network 430 with DC electrical power. In order to rectify the AC to DC, the controller 440 controls the switching of the MOSFETs 422, 424 of the phase legs of the converter to commutate current and affect rectification. For example, the controller 440 may supply PWM signals to the MOSFETs in an appropriate order and with appropriate switching frequency and duty cycle to supply the desired level of DC to the network 430. The controller 440 may operate the converter 420 in a mode in which current is commutated between diodes (i.e., body diodes or separate diodes) and MOSFETs of the phase legs, or in a synchronous rectification mode in which current is commutated between MOSFETs using their bi-directional current carrying capability.

At step 13, the controller 440 determines a condition to the effect that there is a fault in the DC electrical network 430. The determination of a fault may occur in any number of different ways, and the precise details are beyond the scope of the present disclosure. In one example, voltage and current levels are measured at the loads and at a various other positions about the network 430, and faults are recognised by the controller 440 based on changes in the measured current and/or voltage levels. Alternatively, fault detection may take place locally (e.g., at a controller local to a faulted load) and a fault report may then be communicated to the controller 440. Various other ways of determining faults are known and will occur to those skilled in the art.

At step 14, responsive to the determination in step 13, the controller 440 controls the switching of the of the first and second MOSFETs 422, 424 of each phase leg 421a-c to switch the converter into a crow-bar configuration in which current from the electrical machine does not flow to the DC network. One such crow-bar configuration is shown in FIG. 6B, though as noted previously a crow-bar configuration in which current is contained within the upper half of the bridge could be used instead. Since no current flows to the DC network 430 in the crow-bar configuration, the time averaged fault current supplied to the network is reduced.

As described above, the commutation of the current between the branches of the phase legs 421a-c can occur despite the collapse of the DC-side voltage because of the high current carrying capability of the MOSFETs 422, 424 in both the forward and reverse directions. The commutation can occur provided the voltage drop across the MOSFET of a branch is lower than the forward voltage drop across the diode (body diode or separate diode) of the other branch. This will be the case for all operating conditions of the system 400, 400' where the system satisfies the inequality $V_F/R_{DS-ON} > I_{FAULT, MAX}$.

Optionally, at step 15, the controller 440 controls the switching of the MOSFETs 422, 424 of each phase leg 421a-c to switch the converter 420 back to a rectifier state. The rectifier state may be the diode rectifier state or a synchronous rectifier state. If the controller 440 repeatedly switches the converter 420 between a crow-bar configuration and a rectifier configuration, the fault current supplied to the DC network 430 will be controlled to a level between zero and the full fault current level. In this case the current level and waveform can be controlled by controlling PWM control parameters, for example the frequency and duty cycle of the PWM signals. The DC output may also be passed through a filter to smooth the waveform to better approximate a true DC signal.

Optionally, at step 16, after controlling the current level in step 14 and, optionally, step 15, the controller 440 controls the state of one or more circuit breaking components (e.g., contactors) in the DC network 430. For example, the controller 440 may open a DC contactor to isolate a fault from the remainder of the DC network 430. If it is possible to completely isolate the fault, it may be possible to return to the normal operating condition of the system, with full and normal control of the AC to DC converter 420. In other cases the system 400, 400' may remain in the condition of step 14 or step 15 in which the current level is controlled but a fault still remains. In some instances, having safely controlled the current level in the DC network and taken appropriate action, the generator 410 may be disconnected from the drive shaft or may be isolated from the remainder of the electrical power system 400, 400'.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It should also be noted that whilst the embodiments have been described with reference to an aircraft, and to turbofan engines, it will be understood that the principles of the described electrical systems may be applied to other installations, for example to aircraft with turboprop engines, aircraft with purely electric power and propulsion systems, to marine environments such as on a naval vessel powered by gas turbines, a hybrid system or purely electric system, and to other transport applications including trains.

The invention claimed is:

1. An electrical power system comprising:
    an electrical machine operable to output AC;
    a DC electrical network;
    a power electronics converter connected between the AC output of the electrical machine and the DC electrical network and comprising, for each phase of the AC output, a phase leg comprising a first branch having a first bi-directional MOSFET and a second branch having a second bi-directional MOSFET; and
    a controller configured to control switching of the first and second bi-directional MOSFETs of each phase leg of the converter so that, during normal operation of the electrical power system, current is commutated between the first and second branches of the phase leg to rectify the AC input to DC to supply the DC electrical network with DC electrical power, wherein
    the controller is further configured, responsive to a determination to the effect that there is a fault in the DC electrical network, to control the switching of the first and second bi-directional MOSFETs of each phase leg to switch the converter into a crow-bar configuration in which current from the electrical machine does not flow to the DC network,
    the first branch further includes a first diode in parallel with the first bi-directional MOSFET and the second branch further includes a second diode in parallel with the second bi-directional MOSFET, and
    the electrical machine and converter satisfy the inequality $V_F/R_{DS-ON} > I_{FAULT, MAX}$, where
    $V_F$ is a forward voltage drop of the first diode,
    $R_{DS-ON}$ is an on-state resistance of the second MOSFET, and
    $I_{FAULT, MAX}$ is a maximum rated current outputtable by the electrical machine when there is zero voltage across its terminals.

2. The electrical power system of claim 1, wherein the controller is configured, responsive to the determination, to control the switching of the first and second MOSFETs of each phase leg to repeatedly switch the converter between the crow-bar configuration and a rectifier configuration in which current from the electrical machine does flow to the DC network.

3. The electrical power system of claim 2, wherein the controller is configured to modulate a pulse width modulation control parameter of a pulse width modulation signal used to control the repeated switching of the converter between the crow-bar configuration and a rectifier configuration.

4. The electrical power system of claim 1, further comprising a filter for smoothing a waveform of the current supplied to the faulted DC electrical network.

5. The electrical power system of claim 1, wherein the controller is further configured, responsive to the determination, to control the opening of one more circuit breakers or contactors in the DC electrical network.

6. The electrical power system of claim 1, wherein, responsive to the determination, the controller is configured to control the switching of the first and second bi-directional MOSFETs of each phase leg so that current flowing through the first branch of the phase leg is conducted through the first bi-directional MOSFET in a first direction and current flowing through the second branch of the phase leg is conducted through the second bi-directional MOSFET in a second direction opposite to the first direction.

7. The electrical power system of claim 1, wherein, for each phase leg, the first branch includes a first diode connected in parallel with the first bi-directional MOSFET and the second branch includes a second diode connected in parallel with the second bi-directional MOSFET and wherein, during normal operation of the electrical power system, the controller is configured to control the switching of the first and second bi-directional MOSFETs of each phase leg so that current flowing through the first branch of the phase leg is conducted through the first diode in a first direction and current flowing through the second branch of the phase leg is conducted through the second bi-directional MOSFET in a second direction opposite to the first direction.

8. The electrical power system of claim 1, wherein, during normal operation of the electrical power system, the controller is configured to control the switching of the first and second bi-directional MOSFETs of each phase leg so that current flowing through the first branch of the phase leg is conducted through the first bi-directional MOSFET in a first direction and current flowing through the second branch of the phase leg is conducted through the second bi-directional MOSFET in a second direction opposite to the first direction.

9. The electrical power system of claim 1, wherein the first branch includes a first diode connected in parallel with the first bi-directional MOSFET and the second branch includes a second diode connected in parallel with the second bi-directional MOSFET, wherein:

the parallel diodes are separate from the bi-directional MOSFETs; or the parallel diodes are body diodes of the bi-directional MOSFETs.

10. The electrical power system of claim 1, wherein, for each phase leg, the first branch is connected between a phase connection of the electrical machine and a first DC output of the converter, and the second branch is connected between the phase connection of the electrical machine and a second DC output of the converter, and wherein the first and second DC outputs of the converter are connected with the DC electrical network.

11. The electrical power system of claim 1, wherein the first and second bi-directional MOSFETs are silicon carbide (SiC) MOSFETs.

12. An aircraft power and propulsion system comprising:
a gas turbine engine; and
the electrical power system according to claim 1, wherein the electrical machine of the electrical power system is mechanically coupled with a spool of the gas turbine engine.

13. An aircraft comprising the power and propulsion system of claim 12.

14. A method of operating an electrical power system comprising an electrical machine operable to output AC, a DC electrical network and a power electronics converter connected between the AC output of the electrical machine and the DC electrical network, the power electronics converter comprising, for each phase of the output AC, a phase leg comprising a first branch including a first bi-directional MOSFET and a second branch including a second bi-directional MOSFET;

the method comprising:
in a first mode of operation corresponding to normal operation of the electrical power system, controlling switching of the first and second bi-directional MOSFETs of each phase leg so that current is commutated between the first and second branches of the phase leg to rectify the AC input to DC to supply the DC electrical network with DC electrical power; and in a second mode of operation corresponding to operation with a fault in the DC electrical network, controlling switching of the of the first and second MOSFETs of each phase leg to switch the converter into a crow-bar configuration in which current from the electrical machine does not flow to the DC network, wherein in the second mode of operation, the switching of the first and second bi-directional MOSFETs of each phase leg is controlled so that current flowing through the first branch of the phase leg is conducted through the first bi-directional MOSFET in a first direction and current flowing through the second branch of the phase leg is conducted through the second bi-directional MOSFET in a second direction opposite to the first direction.

15. The method of claim 14, wherein the second mode of operation comprises controlling switching of the of the first and second MOSFETs of each phase leg to repeatedly switch the converter between the crow-bar configuration and a rectifier configuration in which current from the electrical machine does flow to the DC network.

16. The method of claim 15, wherein the second mode of operation further comprises modulating a pulse width modulation control parameter of a pulse width modulation signal used to control the repeated switching of the converter between the crow-bar configuration and a rectifier configuration.

17. The method of claim 14, further comprising, after entering the second mode of operation, controlling the opening of one more circuit breakers or contactors in the DC electrical network.

18. An electrical power system comprising:
an electrical machine operable to output AC;
a DC electrical network;
a power electronics converter connected between the AC output of the electrical machine and the DC electrical network and comprising, for each phase of the AC output, a phase leg comprising a first branch having a first bi-directional MOSFET and a second branch having a second bi-directional MOSFET; and a controller configured to control switching of the first and second bi-directional MOSFETs of each phase leg of the converter so that, during normal operation of the electrical power system, current is commutated between the first and second branches of the phase leg to rectify the AC input to DC to supply the DC electrical network with DC electrical power, wherein the controller is further configured, responsive to a determination to the effect that there is a fault in the DC electrical network, to control the switching of the first and second bi-directional MOSFETs of each phase leg to switch the converter into a crow-bar configuration in which current from the electrical machine does not flow to the DC network, and responsive to the determination, the controller is configured to control the switching of the first and second bi-directional MOSFETs of each phase leg so that current flowing through the first branch of the phase leg is conducted through the first bi-directional MOSFET in a first direction and current flowing through the second branch of the phase leg is conducted through the second bi-directional MOSFET in a second direction opposite to the first direction.

* * * * *